(12) United States Patent  
Brown

(10) Patent No.: US 7,918,605 B2
(45) Date of Patent: Apr. 5, 2011

(54) GAS JOURNAL BEARING SYSTEMS AND RELATED METHODS

(75) Inventor: Robert C. Brown, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1501 days.

(21) Appl. No.: 10/956,591

(22) Filed: Sep. 29, 2004

(65) Prior Publication Data

US 2010/0142868 A1  Jun. 10, 2010

(51) Int. Cl.
F16C 32/06 (2006.01)

(52) U.S. Cl. .................. 384/100; 384/109; 384/114

(58) Field of Classification Search .................. 384/100, 384/114, 109; 137/808–813
See application file for complete search history.

(56) References Cited

U.S. PATENT DOCUMENTS

| | | | |
|---|---|---|---|
| 1,952,281 A | 3/1934 | Ranque | |
| 3,107,129 A * | 10/1963 | Brown | 384/114 |
| 3,110,527 A | 11/1963 | Fox | 384/399 |
| 3,321,254 A * | 5/1967 | Dock | 384/114 |
| 3,801,165 A | 4/1974 | Lombard | |
| 4,240,261 A | 12/1980 | Inglis | |
| 4,251,119 A | 2/1981 | Spies | |
| 4,339,926 A | 7/1982 | Moretti et al. | |
| 4,405,098 A | 9/1983 | Spicer | |
| 4,435,839 A * | 3/1984 | Gu et al. | 384/103 |
| 4,486,105 A * | 12/1984 | Miyake et al. | 384/114 |
| 4,884,899 A * | 12/1989 | Schwartzman | 384/100 |
| 4,985,058 A | 1/1991 | Prinsloo et al. | |
| 5,017,022 A | 5/1991 | Ruggles et al. | |
| 5,073,037 A * | 12/1991 | Fujikawa et al. | 384/120 |
| 5,106,204 A | 4/1992 | Dunham | |
| 5,199,796 A | 4/1993 | Enderle et al. | |
| 5,228,785 A * | 7/1993 | Saville et al. | 384/103 |
| 5,433,528 A * | 7/1995 | San Andres | 384/100 |
| 5,508,615 A * | 4/1996 | Doty et al. | 324/321 |
| 5,561,982 A | 10/1996 | Tunkel et al. | |
| 5,628,567 A | 5/1997 | Murabe et al. | |
| 5,713,670 A * | 2/1998 | Goldowsky | 384/115 |
| 5,990,587 A | 11/1999 | Shimanovich et al. | |
| 6,019,515 A | 2/2000 | Fujii et al. | |
| 6,053,636 A * | 4/2000 | Pelfrey et al. | 384/100 |
| 6,147,424 A | 11/2000 | Gomyo et al. | |
| 6,247,460 B1 | 6/2001 | Lindberg | |
| 6,261,002 B1 | 7/2001 | Ermilov et al. | |
| 6,289,679 B1 | 9/2001 | Tunkel | |
| 6,508,590 B2 | 1/2003 | Kusunoki | |
| 6,581,857 B2 * | 6/2003 | Fujii et al. | 239/703 |
| 2004/0109622 A1* | 6/2004 | Fujikawa et al. | 384/107 |
| 2005/0163407 A1* | 7/2005 | Kang et al. | 384/106 |

\* cited by examiner

Primary Examiner — Thomas R Hannon
Assistant Examiner — Phillip A Johnson
(74) Attorney, Agent, or Firm — William W. Randolph; Lawrence E. Anderson

(57) ABSTRACT

Gas journal bearing systems are provided. An exemplary gas journal bearing system comprises a vortex generator, a housing and a journal. The vortex generator is operative to receive a flow of gas and to impart an angular acceleration to the gas. The housing is in fluid communication with the vortex generator, with housing having a first exhaust through which the gas is exhausted. The journal is supported within the housing by a vortex of the gas as the gas swirls along at least a portion of a length of the journal. Methods and other systems also are provided.

21 Claims, 8 Drawing Sheets

GAS JOURNAL BEARING SYSTEMS AND RELATED METHODS

GOVERNMENT INTEREST

The invention described herein may be manufactured, used, and licensed by or for the United States Government.

BACKGROUND

1. Technical Field

The invention generally relates to bearings.

2. Description of the Related Art

Generally, there are two types of bearings: 1) thrust bearings that support loads axially along their journals, and 2) journal bearings that support loads orthogonal to the journal axes. Of journal bearings, there are generally two types, namely, hydrodynamic journal bearings and gas journal bearings.

A prior art hydrodynamic journal bearing is depicted schematically in FIG. 1. As shown in FIG. 1 (which is an end view), a journal bearing 10 includes a tube 12 filled with a lubricant 14. The lubricant (e.g., oil) surrounds a rotating journal 16. As the journal rotates (as indicated by arrow A), adhesion of the lubricant to the journal and the viscosity of the lubricant creates a wedge 18 of lubricant between the journal and the inner wall 20 of the tube. Wedge 18 supports the load on the journal and maintains separation between the journal and the inner wall.

The load-carrying capacity of the journal bearing 10 depends on the viscosity of the lubricant and the clearance between the journal and the inner wall. Higher viscosity lubricants provide higher load-carrying capacity (bearing stiffness), but the higher viscosity also causes resistance to journal rotation.

If a journal bearing, such as depicted in FIG. 1, operates in a high-speed and/or a high-temperature environment, the viscosity of the lubricant has a major impact on the performance of the bearing. Specifically, high-temperatures decrease the viscosity and the load-carrying capacity of the bearing. Also, high-speed journal rotation increases the turbulence and the oil temperature and decreases the oil viscosity.

Gas journal bearings (sometimes referred to as "air journal bearings") are widely used, especially in high-speed and high-temperature applications. Air or inert gases are commonly used as the lubricant because of the extremely low viscosity and resistance to high temperatures.

Generally, there are two types of gas journal bearings: (1) aerodynamic (self actuating) gas journal bearings, and (2) externally pressurized gas journal bearings. An aerodynamic gas journal bearing creates a lubricating cushion of gas when the relative motion of two surfaces rams gas into the small space between them. In effect, these bearings create a "wedge" of gas with sufficient static pressure to support a load in the same manner that the hydrodynamic journal bearings create a wedge of oil. These bearings do not require an external source of gas but, due to the typically low viscosity of gas, require extremely close tolerances with small distances between the two surfaces. These bearings are typically used in small instruments, such as computer disk drives.

Externally pressurized gas journal bearings use gas from a compressor and/or a compressed gas tank source that forces gas into the space between the two surfaces to create a bearing. Thus, the wedge of gas is forcefully created independent of the relative motion between the two surfaces. Some externally pressurized gas journal bearings use the static pressure between two plates to form the bearing, while others create a dynamic pressure by directing a stream of gas at a high velocity orthogonal to a surface to form a bearing. Both techniques require a constant replenishment of the gas in the bearing to maintain the required pressure and bearing stiffness. Thus, complex channeling of the gas through porous material or directional inlets is typically required to create such bearings.

SUMMARY

Gas journal bearing systems and related methods are provided. An embodiment of a gas journal bearing system comprises a vortex generator, a housing, and a journal. The vortex generator is operative to receive a flow of gas and to impart an angular acceleration to the gas. The housing is in fluid communication with the vortex generator, with the housing having a first exhaust through which the gas is exhausted. The journal is supported within the housing by a vortex of the gas as the gas swirls along at least a portion of a length of the journal.

Another embodiment of a gas journal bearing system comprises a journal and means for generating a vortex of gas, such that the vortex of gas supports the journal.

An embodiment of a method for supporting a journal comprises: providing a journal and generating a vortex of gas such that the vortex of gas supports the journal.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Gas journal bearing systems are provided that involve the use of vortex tubes. As will be described in detail, such systems can provide load-compensating, high-stiffness, oil-free and/or omni-directional bearings that can be applied to a wide range of mechanical and industrial problems.

Figure 1:
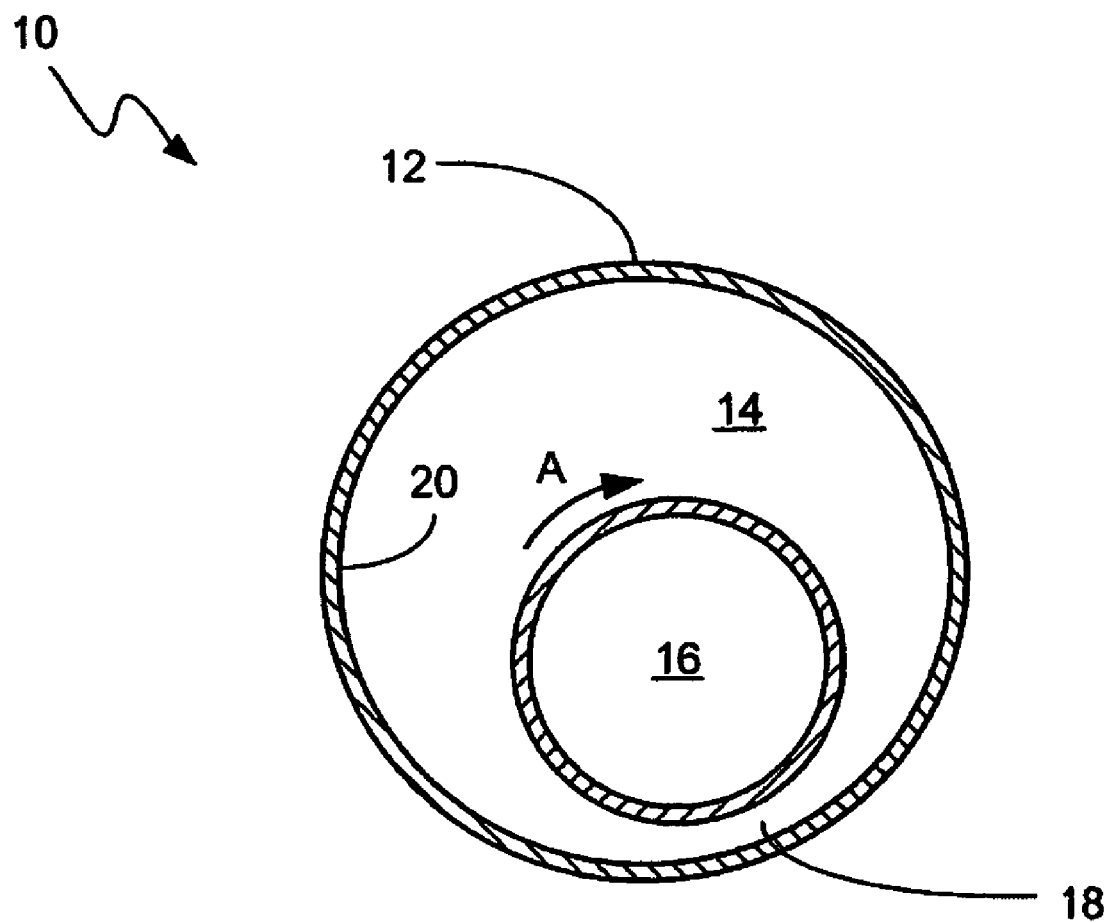
FIG. 1 is a schematic end view of a prior art hydrodynamic journal bearing.
Figure 2:
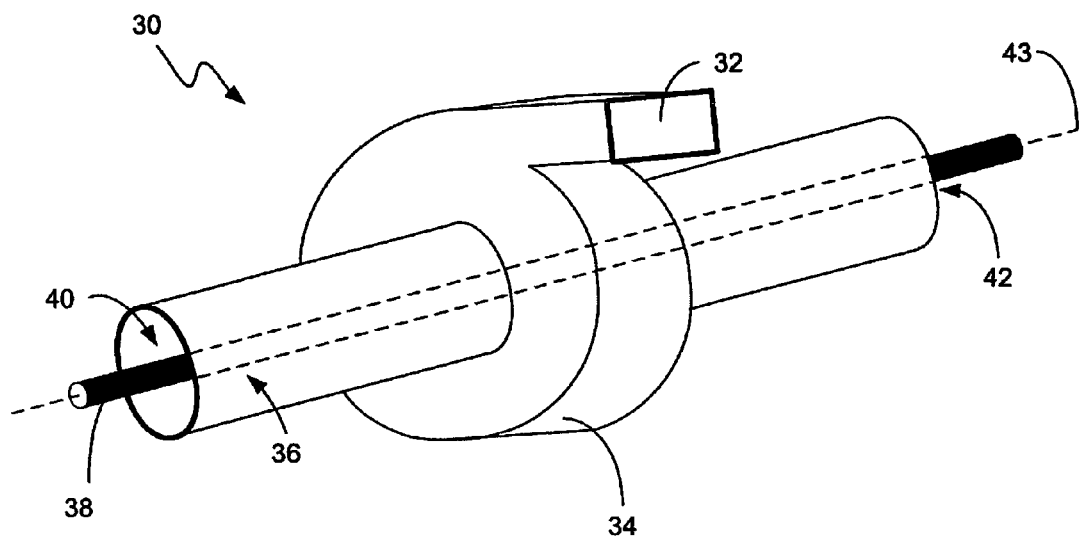
FIG. 2 is a perspective view of an embodiment of a vortex tube gas journal bearing.

FIG. 2 is a perspective view of an embodiment of a vortex tube gas journal bearing. As shown in FIG. 2, vortex tube gas journal bearing 30 includes an inlet 32, a vortex generator 34, a housing 36, a journal 38 and exhausts 40 and 42. The inlet 32 allows gas (e.g. air) to enter the vortex generator 34. From the vortex generator, the gas enters the housing 36, which, in this embodiment, is a tube that is oriented perpendicular to the vortex generator 34. At least a portion of journal 38 is located within the housing 36. Journal 38 is supported by the gas provided to the housing by the vortex generator. The gas used to support the journal within the housing is discharged by the exhausts 40 and 42.

Figure 3:
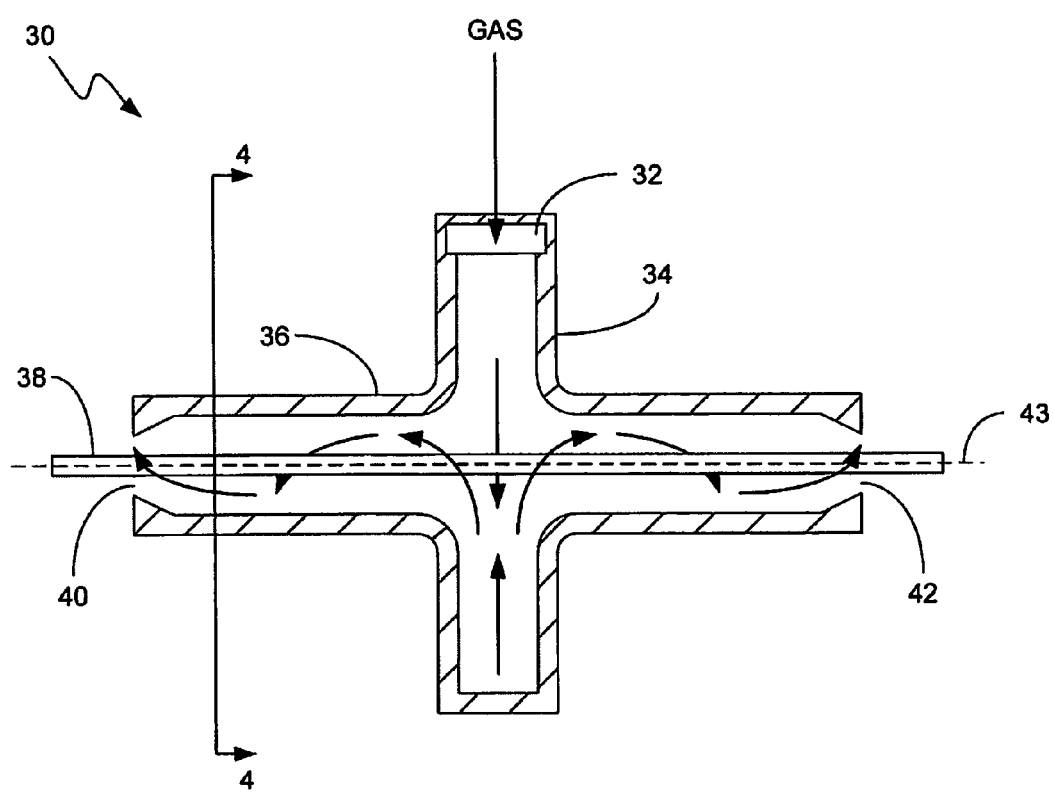
FIG. 3 is a schematic diagram of the vortex tube gas journal bearing of FIG. 2.

In operation, a compressed gas source (not shown in FIG. 2) injects gas through inlet 32 into vortex generator 34 in a direction generally perpendicular to the longitudinal axis 43 of the housing 36. As shown in FIG. 3, the gas (generally depicted by arrows) enters the vortex generator 34 and is directed along a radius of curvature within the vortex generator that is longer than that of the housing 36. Thus, as the gas is forced into the smaller radius of the housing, conservation of angular momentum increases the velocity of the gas and forms a vortex within the housing. The strength of the vortex can be changed by adjusting the velocity of the gas entering the generator.

The vortex of gas located in the housing surrounds the journal 38 and spirals along the length of the housing toward the exhausts 40, 42. The pressure profile of the vortex provides support and stiffness to the journal 38. Specifically, the well-known Bernoulli equation describes the pressure profile across the vortex within the housing. The journal, which preferably rotates counter to the rotation of the vortex, can be analogized to a cylinder embedded in a uniform flow. Therefore, the "Kutta-Joukowski Lift Theorem" and the "Magnus Effect" equations are applicable for subsonic vortices.

Figure 4A:
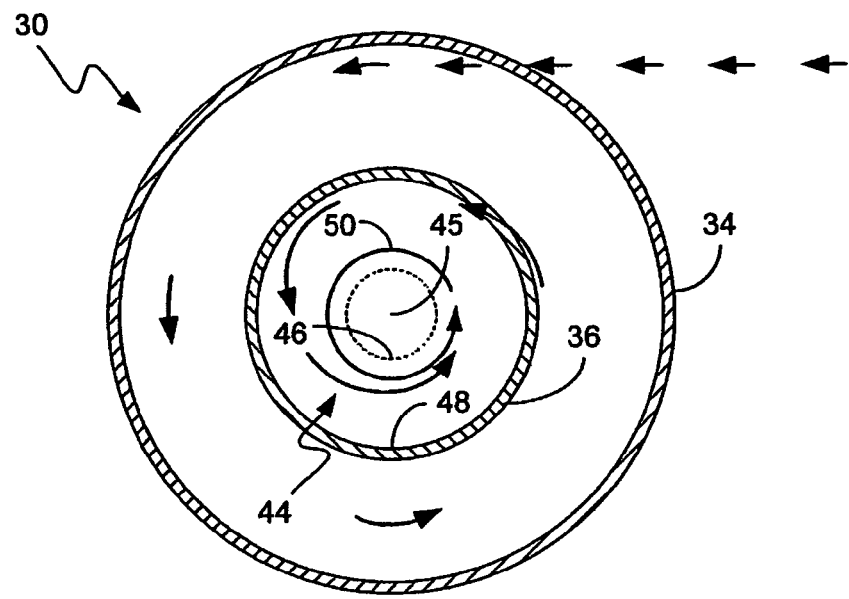
FIG. 4A is a schematic diagram of the vortex tube gas journal bearing of FIGS. 2 and 3, viewed in the direction of section line 4-4 of FIG. 3, with the journal removed for clarity.

The vortex 44 located in the housing is shown in greater detail in the schematic, end view of FIG. 4A (the journal 38 being removed for clarity). As shown in FIG. 4A, vortex 44 includes a vortex eye 45 that has a velocity of zero. Therefore, the static pressure at the vortex eye is relatively low. The velocity rapidly increases from zero at the eye edge 46 to a maximum, and then drops off to zero again at the boundary, i.e., at the inner wall 48 of the housing. The dynamic pressure of the vortex is proportional to the square of the velocity. Therefore, the velocity profile includes a ring 50 of relatively high dynamic pressure encircling the low static pressure within the vortex eye 45.

Figure 4B:
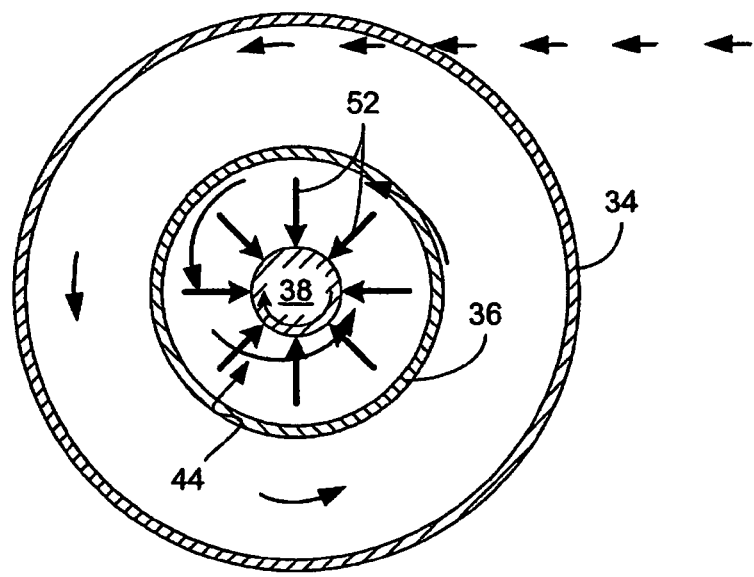
FIG. 4B is a schematic diagram depicting the pressure forces on the journal of the vortex tube gas journal bearing of FIGS. 2-4A, viewed in the direction of section line 4-4 of FIG. 3, under a no-load condition.

FIG. 4B depicts the pressure forces on a journal under no-load conditions. The housing 36 contains the vortex 44, as depicted in FIG. 4A, that surrounds the unloaded journal 38. The pressure profile of the vortex creates a pressure field 52 (depicted by the inward-facing arrows) that is directed towards the eye of the vortex. The magnitude of the pressure field is highest where the velocity is the highest and, therefore, the pressure field exhibits its highest magnitude at ring 50, as depicted in FIG. 4A.

Under the no-load condition of FIG. 4B with the journal at the center of the housing, the pressure field created by the vortex is symmetrical. However, under a load (as will be described later), the journal is displaced at some distance away from the center in the direction of the load. The pressure field compensates for the displacement and becomes asymmetrical.

Figure 5:
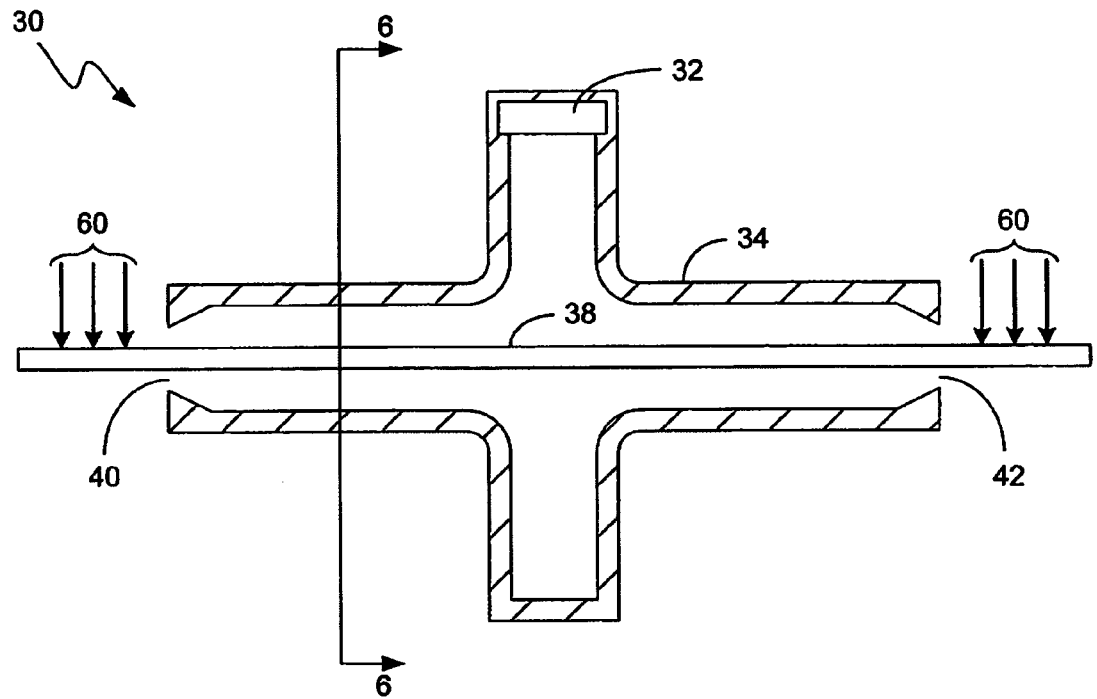
FIG. 5 is a schematic diagram of another embodiment of a vortex tube gas journal bearing.
Figure 6:
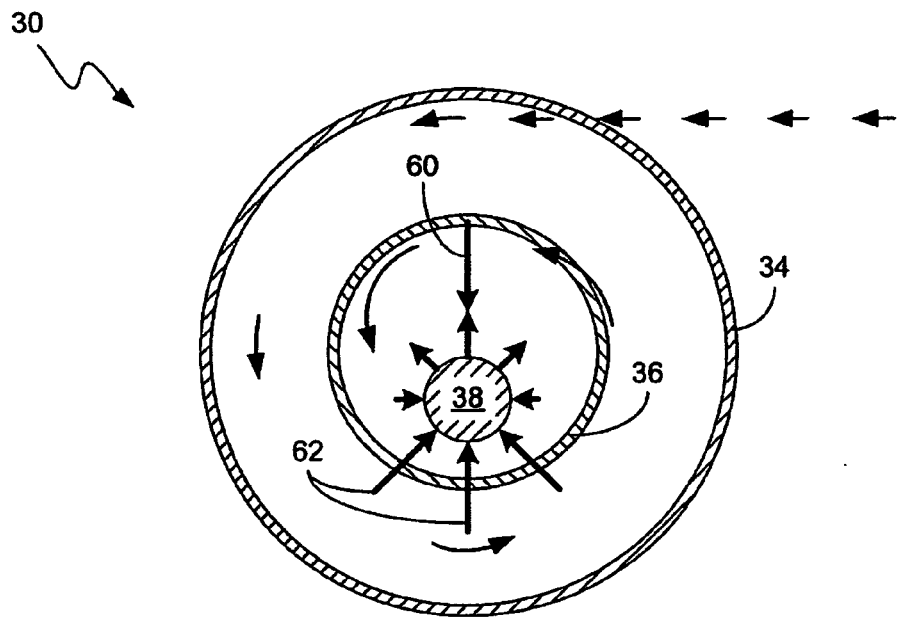
FIG. 6 is a schematic diagram depicting the pressure forces on the journal of the vortex tube gas journal bearing of FIG. 5, viewed in the direction of section line 6-6 of FIG. 5, under a load condition (without drag).

FIG. 5 is a schematic diagram of the embodiment of the vortex tube gas journal bearing of FIGS. 2-4B, with journal 38 supporting a load 60 (indicated by downward arrows) and without drag. As shown in FIG. 6, load 60 displaces journal 38 from the center of the housing. As the journal crosses from the relatively low pressure area near the eye wall of the vortex toward the high-pressure ring surrounding the eye wall, pressure exerted on the underside of the journal increases. This increase in exerted pressure tends to re-center the journal. Specifically, the upward arrows indicate the resultant asymmetrical pressure field 62 that counters the load 60 and tends to re-center the journal 38 within housing 36. Note that the asymmetry of the pressure field 62 not only creates a resisting force in direct opposition to the load, but the stiffness of the bearing increases. Thus, the bearing is not only load compensating, but resistant to load shocks as well.

Figure 7:
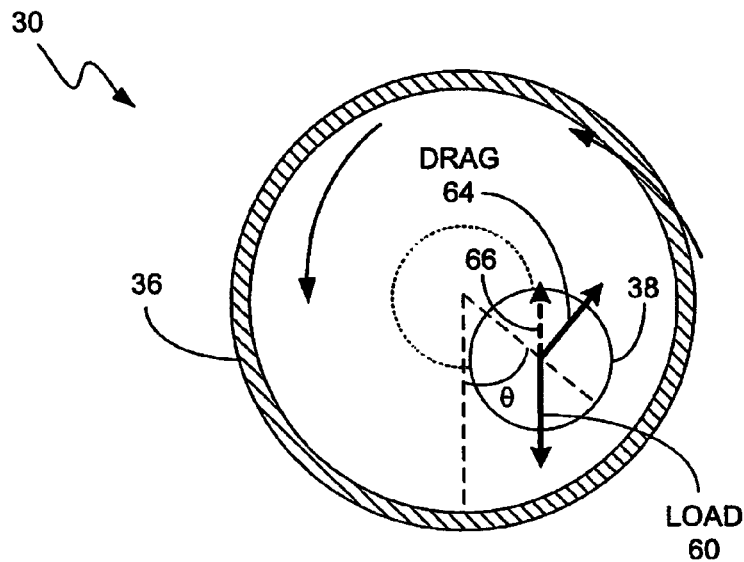
FIG. 7 is a schematic diagram depicting the pressure forces on the journal of the vortex tube gas journal bearing of FIG. 5, viewed in the direction of section line 6-6 of FIG. 5, under a load condition (with drag).

FIG. 7 is a schematic diagram of the embodiment of the vortex tube gas journal bearing of FIGS. 2-6, with journal 38 supporting load 60 and with drag. Note that the vortex generator is removed for clarity.

Specifically, when journal 38 is displaced from the center of the housing 36, the journal is subjected to a drag force 64 in the same direction as the vortex flow. This drag force tends to displace the journal at an angle $\theta$ from the load vector. As the journal is displaced, the vertical component 66 of the drag force resists the load 60 as well as the pressure field (not shown) created by the vortex. Thus, equilibrium should be reached with the journal being at a location other than the exact center of the housing. Note that the location of equilibrium tends to drift for a given vortex strength depending upon journal rotational speed, load, and drag.

As will be described next, embodiments of a vortex tube journal air bearing can be provided in various configurations. For instance, the number and location of vortex generators, exhaust vents, and/or locations for accommodating loads can vary.

Figure 8:
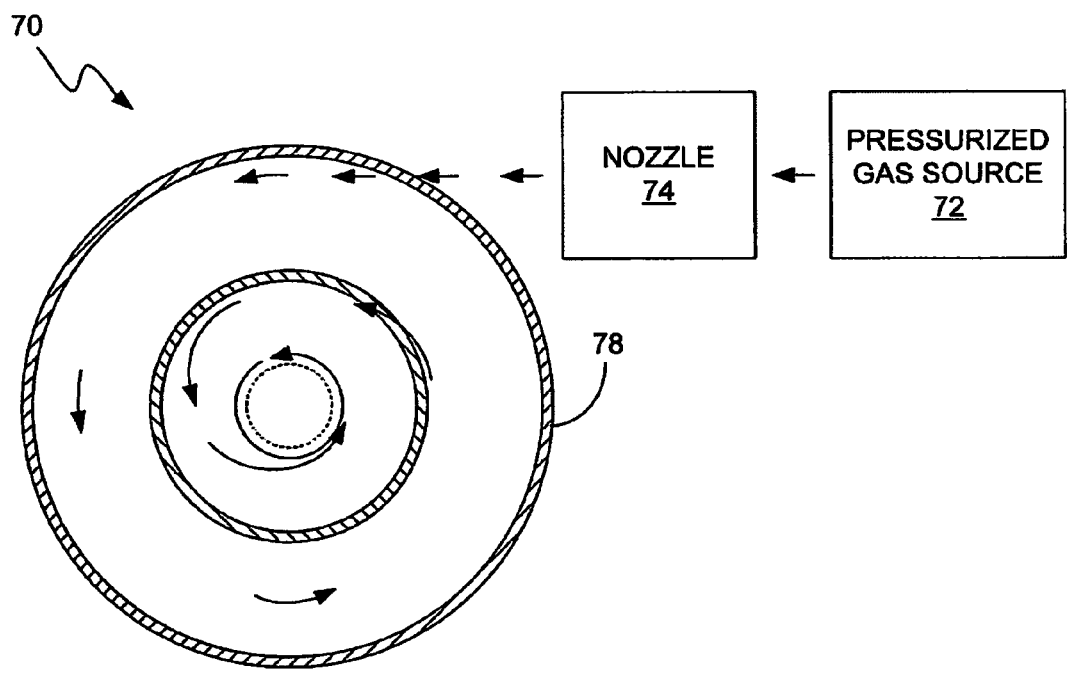
FIG. 8 is a schematic diagram of an embodiment of a vortex tube gas journal bearing with a pressurized gas source and nozzle.

In this regard, FIG. 8 is a schematic view of another embodiment of a vortex tube journal air bearing that includes a pressurized gas source. Specifically, bearing 70 uses a pressurized gas source 72 to provide a pressurized flow of gas to a nozzle 74. The nozzle 74, e.g., a Venturi-type nozzle, increases the velocity of the gas and provides the gas at a higher velocity to the vortex generator 78.

Figure 9:
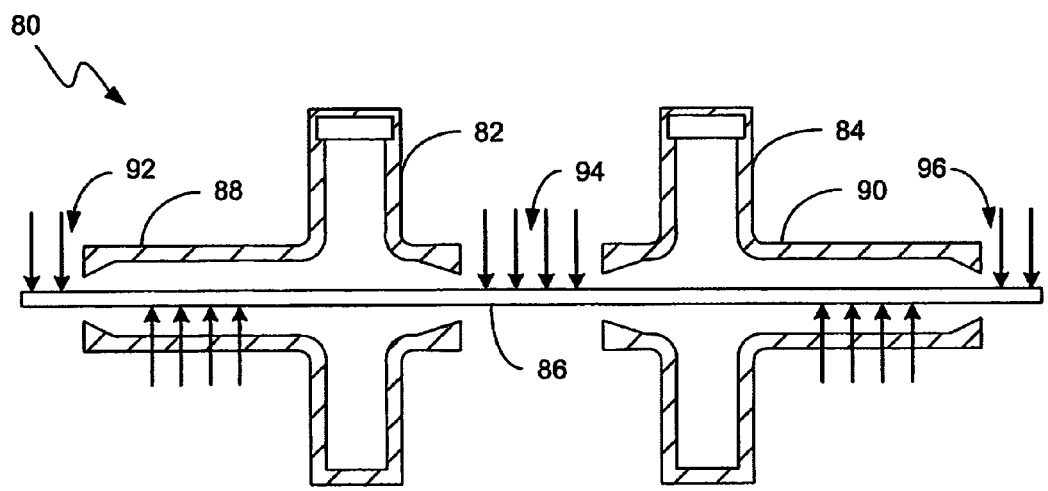
FIG. 9 is a schematic diagram of an embodiment of a vortex tube gas journal bearing with dual vortex generators.

FIG. 9 is a schematic view of another embodiment of a vortex tube journal air bearing that includes dual vortex generators. Specifically, bearing 80 includes vortex generators 82, 84 that support a journal 86. The journal 86 extends through the housings 88, 90 of the bearing and, thus, provides multiple locations at which a load can be supported. In particular, locations 92, 94 and 96 can support loads, which are generally depicted as downwardly directed arrows (the upwardly directed arrows represent the resulting pressure field).

Figure 10:
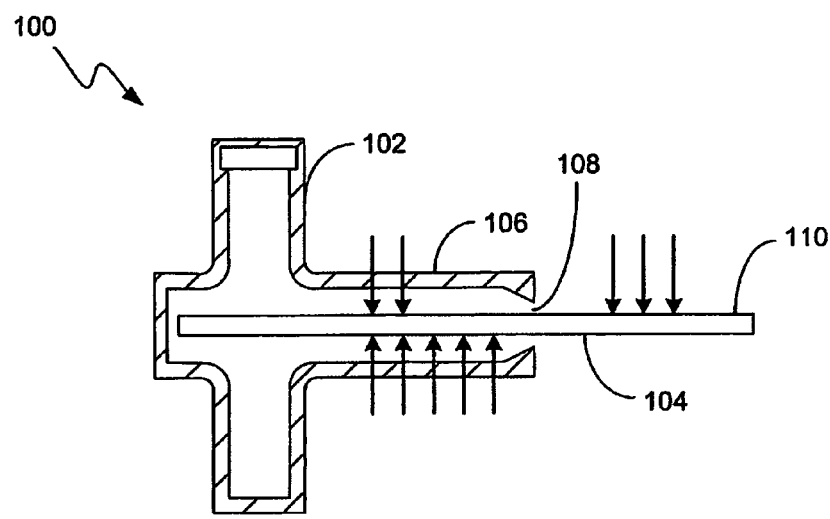
FIG. 10 is a schematic diagram of an embodiment of a vortex tube gas journal bearing in a spindle configuration.

FIG. 10 is a schematic view of another embodiment of a vortex tube journal air bearing. Specifically, bearing 100 exhibits a spindle configuration and includes a vortex generator 102 and a journal 104. In contrast to the housings of previous embodiments, housing 106 of bearing 100 includes only one open end 108 through which journal 104 extends. Note that a load located toward the end 110 of the journal creates a moment that tends to rotate the journal with respect to a longitudinal axis of the journal. The pressure field created within the housing tends to compensate for this rotation as described before.

Figure 11:
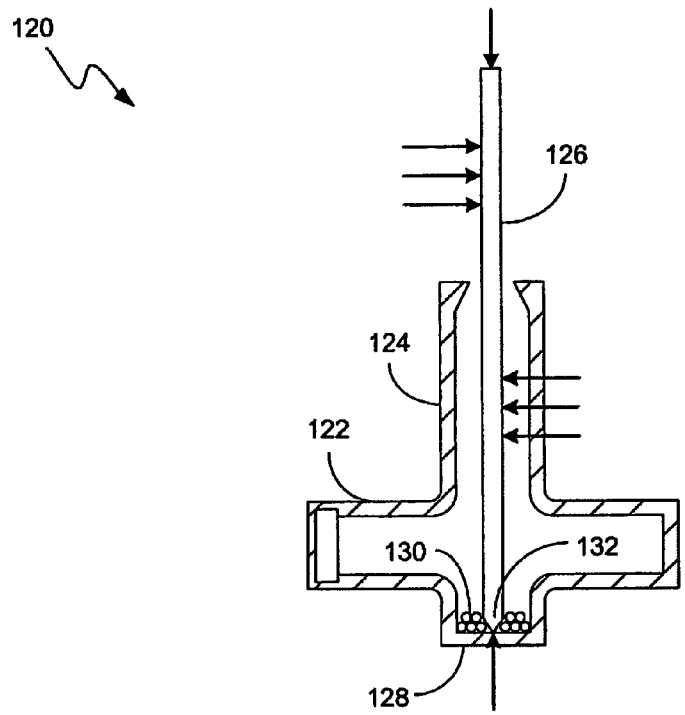
FIG. 11 is a schematic diagram of an embodiment of a vortex tube gas journal bearing used in a hybrid thrust/journal bearing configuration.

FIG. 11 is a schematic view of another embodiment of a vortex tube journal air bearing. In particular, bearing 120 is configured as a hybrid thrust/journal bearing that includes a vortex generator 122, a housing 124, and a journal 126. Unlike a journal bearing, a thrust bearing can support a load along the longitudinal axis of the journal. In this embodiment, the closed end 128 of the housing includes a packed bearing 130, e.g., ball bearings, that surround an end 132 of the journal. The packed bearing 130 supports the end 132 of the journal and assists in maintaining the position of the end 132 of the journal in response to side loads and resulting moments.

Figure 12:
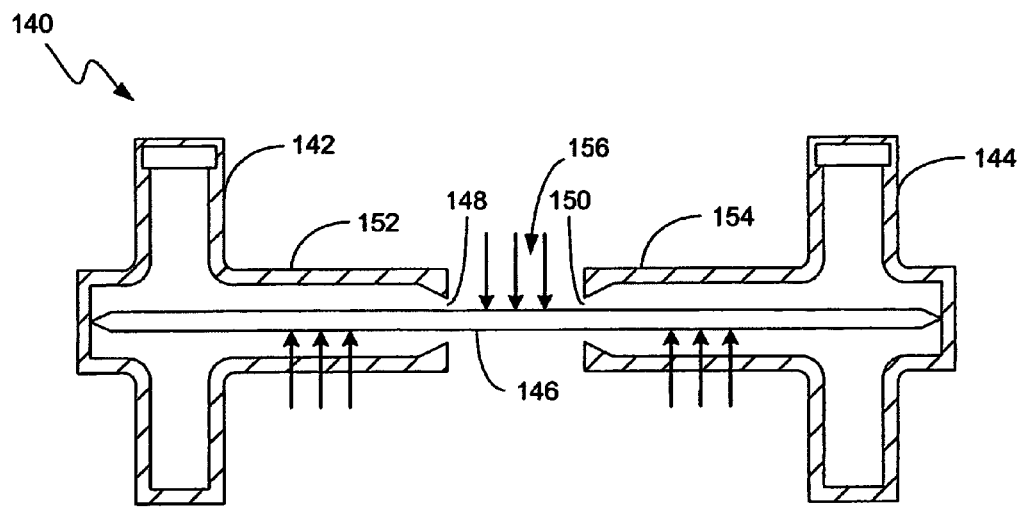
FIG. 12 is a schematic diagram of an embodiment of a vortex tube gas journal bearing with dual, outside-mounted vortex generators.

FIG. 12 is a schematic view of another embodiment of a vortex tube journal air bearing. Specifically, bearing 140 includes vortex generators 142, 144 that support a journal 146. The journal 146 extends between opposing open ends 148, 150 of the respective housings 152, 154 of the bearing. In this configuration, the bearing can accommodate a load at location 156.

It should be emphasized that many variations and modifications may be made to the above-described embodiments. For instance, modifying the exterior surface of a journal, e.g., by incorporating grooves, dimples, ridges, and/or bumps, can alter the aerodynamic performance of a bearing. The journal shape can even be modified to look more like a camshaft or elliptical rather than circular in cross section.

All such modifications and variations are intended to be included herein within the scope of this disclosure and protected by the following claims.

What is claimed is:

1. A gas journal bearing system comprising:
a vortex generator operative to receive a flow of gas and to impart an angular acceleration to the gas;
a housing in fluid communication with the vortex generator, the housing having a first exhaust vent through which the gas is exhausted; and
a journal supported within the housing by a vortex of the gas as the gas swirls along at least a portion of a length of the journal.

2. The gas journal bearing system of claim 1, wherein the journal rotates within the housing in a direction counter to the rotation of the gas within the housing.

3. The gas journal bearing system of claim 1, wherein:
the housing has a first end; and
the journal extends outwardly from the first end.

4. The gas journal bearing system of claim 3, wherein:
the housing has a second end; and
the journal also extends outwardly from the second end.

5. The gas journal bearing system of claim 3, wherein the first exhaust vent is located at the first end.

6. The gas journal bearing system of claim 5, wherein the journal extends through the first exhaust vent.

7. The gas journal bearing system of claim 1, wherein:
the angular acceleration imparted to the gas by the vortex generator is substantially oriented within a plane; and
the housing extends substantially perpendicular to the plane.

8. The gas journal bearing system of claim 1, wherein:
the vortex generator is a first vortex generator; and
the system additionally comprises:
a second vortex generator, the journal being supported by a second vortex associated with the second vortex generator.

9. The gas journal bearing system of claim 8, wherein:
the housing is a first housing; and
the system additionally comprises:
a second housing in fluid communication with the second vortex generator, the journal being supported within the second housing by the second vortex.

10. The gas journal bearing system of claim 8, wherein:
the first housing is spaced from the second housing; and
a portion of the journal spans between the first housing and the second housing such that the portion of the journal is configured to carry a load.

11. The gas journal bearing system of claim 10, wherein:
the journal has a first end and a second end;
the first end of the journal extends outwardly from the first housing; and
the second end of the journal extends outwardly from the second housing.

12. The gas journal bearing system of claim 1, further comprising:
a pressurized gas source in fluid communication with the vortex generator for providing the gas to the vortex generator.

13. The gas journal bearing system of claim 12, further comprising:
a nozzle positioned to receive the gas from the pressurized gas source and being operative to increase a velocity of the gas and provide the gas to the vortex generator.

14. The gas journal bearing system of claim 1, wherein the gas is air.

15. The gas journal bearing system of claim 1, wherein the housing is a tube.

16. A gas journal bearing system comprising:
a journal;
at least one exhaust; and
means for generating a vortex of gas in the shape of a spiral such that the vortex of gas supports the journal;
whereby the gas exits from the journal bearing system through the at least one exhaust.

17. The gas journal bearing system of claim 16, further comprising:
means for containing the vortex of gas.

18. A method for supporting a journal comprising:
providing a journal, a housing, a vortex generator and at least one exhaust; and
generating a vortex of gas such that the vortex of gas located in the housing surrounds and supports the journal as the vortex of gas spirals along the length of the housing toward the at least one exhaust.

19. The method of claim 18, further comprising:
supporting an axial load with the journal.

20. The method of claim 18, further comprising:
supporting a transverse load with the journal.

21. The method of claim 18, wherein:
the vortex is a first vortex; and
the method additionally comprises:
supporting the journal with a second vortex.

* * * * *